US011227050B1

(12) United States Patent
Gates et al.

(10) Patent No.: US 11,227,050 B1
(45) Date of Patent: Jan. 18, 2022

(54) SYSTEMS AND METHODS FOR VERIFYING DECENTRALIZED FEDERATED DATA USING INFLUENCE EVALUATION (71) Applicant: Symantec Corporation, Mountain View, CA (US)

(72) Inventors: Christopher Gates, Culver City, CA (US); Yufei Han, Antibes (FR)

(73) Assignee: NortonLifeLock Inc., Tempe, AZ (US)

( * ) Notice: Subject to any disclaimer, the term of this patent is extended or adjusted under 35 U.S.C. 154(b) by 368 days.

(21) Appl. No.: 16/369,959

(22) Filed: Mar. 29, 2019

(51) Int. Cl.
*G06F 21/56* (2013.01)
*G06N 20/00* (2019.01)

(52) U.S. Cl.
CPC ............. *G06F 21/56* (2013.01); *G06N 20/00* (2019.01); *G06F 2221/034* (2013.01)

(58) Field of Classification Search
CPC .. G06F 21/56; G06F 21/577; G06F 2221/034; G06N 20/00; G06K 9/6256; G06K 9/6262
See application file for complete search history.

(56) References Cited

U.S. PATENT DOCUMENTS

| | | | | |
|---|---|---|---|---|
| 10,713,321 B1* | 7/2020 | Wen | ......... | G06N 20/20 |
| 2006/0047617 A1* | 3/2006 | Bacioiu | .......... | G06K 9/6262 706/59 |
| 2015/0074035 A1* | 3/2015 | Narasappa | ............ | G06N 7/005 706/52 |
| 2018/0189498 A1* | 7/2018 | Boutnaru | ................ | G06F 21/52 |
| 2018/0375885 A1* | 12/2018 | Chen | ................... | H04L 63/1416 |
| 2019/0042937 A1* | 2/2019 | Sheller | ..................... | G06N 3/08 |
| 2019/0042953 A1* | 2/2019 | Duesterwald | .......... | G06N 20/00 |
| 2019/0251479 A1* | 8/2019 | Anderson | ........... | H04L 63/1441 |
| 2019/0362072 A1* | 11/2019 | Kesarwani | ............. | G06F 21/56 |
| 2020/0019821 A1* | 1/2020 | Baracaldo-Angel | ... | G06K 9/623 |
| 2020/0234184 A1* | 7/2020 | Kesarwani | ........ | G06F 16/90335 |

OTHER PUBLICATIONS

Bhagoji AN, Chakraborty S, Mittal P, Calo S. Model poisoning attacks in federated learning. In Proc. Workshop Secur. Mach. Learn. (SecML) 32nd Conf. Neural Inf. Process. Syst. (NeurIPS) Dec. 2018. (Year: 2018).*

Jagielski M, Oprea A, Biggio B, Liu C, Nita-Rotaru C, Li B. Manipulating machine learning: Poisoning attacks and countermeasures for regression learning. In 2018 IEEE Symposium on Security and Privacy (SP) May 20, 2018 (pp. 19-35). IEEE. (Year: 2018).*

(Continued)

*Primary Examiner* — Robert B Leung
(74) *Attorney, Agent, or Firm* — FisherBroyles, LLP (57) ABSTRACT The disclosed computer-implemented method for verifying decentralized federated data using influence evaluation may include (i) calculate an influence score for each of a group of data instances, (ii) rank the data instances based on the influence scores, (iii) determine an anomaly score for each of the ranked data instances, (iv) select the ranked data instances with the highest anomaly scores as containing potentially malicious data, and (v) perform a security action that protects against the potentially malicious data. Various other methods, systems, and computer-readable media are also disclosed.

18 Claims, 7 Drawing Sheets

(56) References Cited

OTHER PUBLICATIONS

Fung C, Yoon CJ, Beschastnikh I. Mitigating sybils in federated learning poisoning. arXiv preprint arXiv:1808.04866. Aug. 14, 2018. (Year: 2018).*

N. Baracaldo, B. Chen, H. Ludwig, A. Safavi and R. Zhang, "Detecting Poisoning Attacks on Machine Learning in IoT Environments," 2018 IEEE International Congress on Internet of Things (ICIOT), 2018, pp. 57-64, doi: 10.1109/ICIOT.2018.00015. (Year: 2018).*

Koh et al., "Understanding Black-box Predictions via Influence Functions", Jul. 10, 2017, 11 pages.

* cited by examiner

SYSTEMS AND METHODS FOR VERIFYING DECENTRALIZED FEDERATED DATA USING INFLUENCE EVALUATION

BACKGROUND

Enterprise and consumer cloud computing networks are increasingly at risk of being victimized by decentralized or federated attacks on the training of machine-learning models including poisoned data attacks and noisy or mislabeled training data. Often, these attacks are the result of different endpoints/nodes all contributing data to train a single global machine-learning model.

Traditional security solutions for protecting against attacks on the training of machine-learning models are typically configured for centralized setting models where all of the data is directly received and validated from a single source. Thus, even if all of the data is not trusted, since all of it received, the ability to inspect the data when needed is available. However, these traditional solutions are ineffective in decentralized/federated settings due to the inability to perform data inspection on all of the data from a single source.

SUMMARY

As will be described in greater detail below, the present disclosure describes various systems and methods for verifying decentralized federated data using influence evaluation.

In one example, a method for verifying decentralized federated data using influence evaluation may include (i) calculating, by one or more federated client computing devices, an influence score for each of a group of data instances, (ii) ranking, by the federated client computing devices, the data instances based on the influence scores, (iii) determining, by federated client computing devices, an anomaly score for each of the ranked data instances, (iv) selecting, by the federated client computing devices, the ranked data instances with the highest anomaly scores as containing potentially malicious data, and (v) performing, by the federated client computing devices, a security action that protects against the potentially malicious data.

In some examples, the group of data instances may be training data for updating a global machine-learning model associated with each of the federated client computing devices. In some embodiments, the influence score may be calculated by (i) determining a matrix based on a set of training data parameters utilized for updating a global machine-learning model by the data instances and (ii) utilizing the matrix to calculate the influence score based at least in part on an impact that each of the data instances has on the set of training data parameters. In one example, the impact that each of the data instances has on the set of training data parameters may include a degree of error in predicting a target training data parameter when the target training data parameter is removed from the set of training data parameters.

In some embodiments, ranking the data instances may include ranking a number of the data instances below a predetermined threshold. Additionally or alternatively, the data instances may be ranked based on a predetermined influence score.

In some examples, the anomaly score may be determined by (i) identifying a classification label for each of the ranked data instances, (ii) selecting a group of additional data instances near the ranked data instances, and (iii) determining the anomaly score based on a fraction of the additional data instances having a classification label that is inconsistent with the classification label for the ranked data instances. Additionally or alternatively, the anomaly score may be determined by (i) selecting at least one of the ranked data instances, (ii) calculating an average distance between the selected ranked data instance and an additional data instance on each of the federated clients, and (iii) determining the anomaly score based on a ratio between the average distance and a largest distance between the selected data instance and the additional data instance. Additionally or alternatively, the anomaly score may be determined by (i) removing at least one data point from the ranked data instances, (ii) determining an effect of the removed at least one data point on a federated machine-learning model during a model update, and (iii) determining the anomaly score based on a deviation in the model update caused by the removed at least one data point.

In some examples, the security action may be performed by (i) removing the data instances with the highest anomaly scores and (ii) flagging the data instances with the highest anomaly scores as containing the potentially malicious data.

In one embodiment, a system for verifying decentralized federated data using influence evaluation may include at least one physical processor and physical memory that includes a set of modules and computer-executable instructions that, when executed by the physical processor, cause the physical processor to (i) calculate, by a calculation module, an influence score for each of a group of data instances, (ii) rank, by a ranking module, the data instances based on the influence scores, (iii) determine, by a determining module, an anomaly score for each of the ranked data instances, (iv) select, by a selection module, the ranked data instances with the highest anomaly scores as containing potentially malicious data, and (v) perform, by a security module, a security action that protects against the potentially malicious data.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) calculate an influence score for each of a group of data instances, (ii) rank the data instances based on the influence scores, (iii) determine an anomaly score for each of the ranked data instances, (iv) select the ranked data instances with the highest anomaly scores as containing potentially malicious data, and (v) and perform a security action that protects against the potentially malicious data.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for verifying decentralized federated data using influence evaluation. As will be described in greater detail below, by calculating training data influence scores and ranking training data instances utilized by federated computing devices to update a machine-learning model, the systems and methods described herein may be able to identify potentially malicious (e.g., poisoned) data that may most negatively impact data verification in the model training process. In addition, the systems and methods described herein may improve the security of computing devices in a network by protecting against potentially malicious data on federated computing devices from being utilized in the training and updating of machine-learning models.

Figure 1:
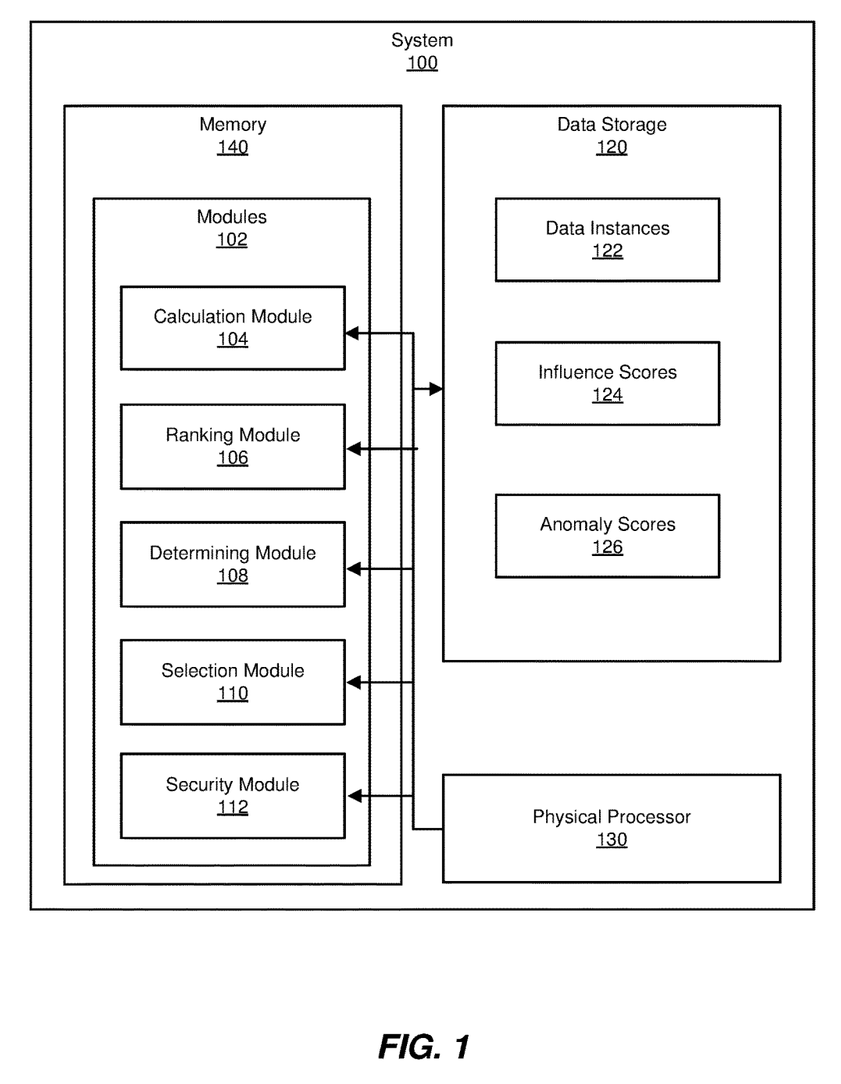
FIG. 1 is a block diagram of an example system for verifying decentralized federated data using influence evaluation.
Figure 2:
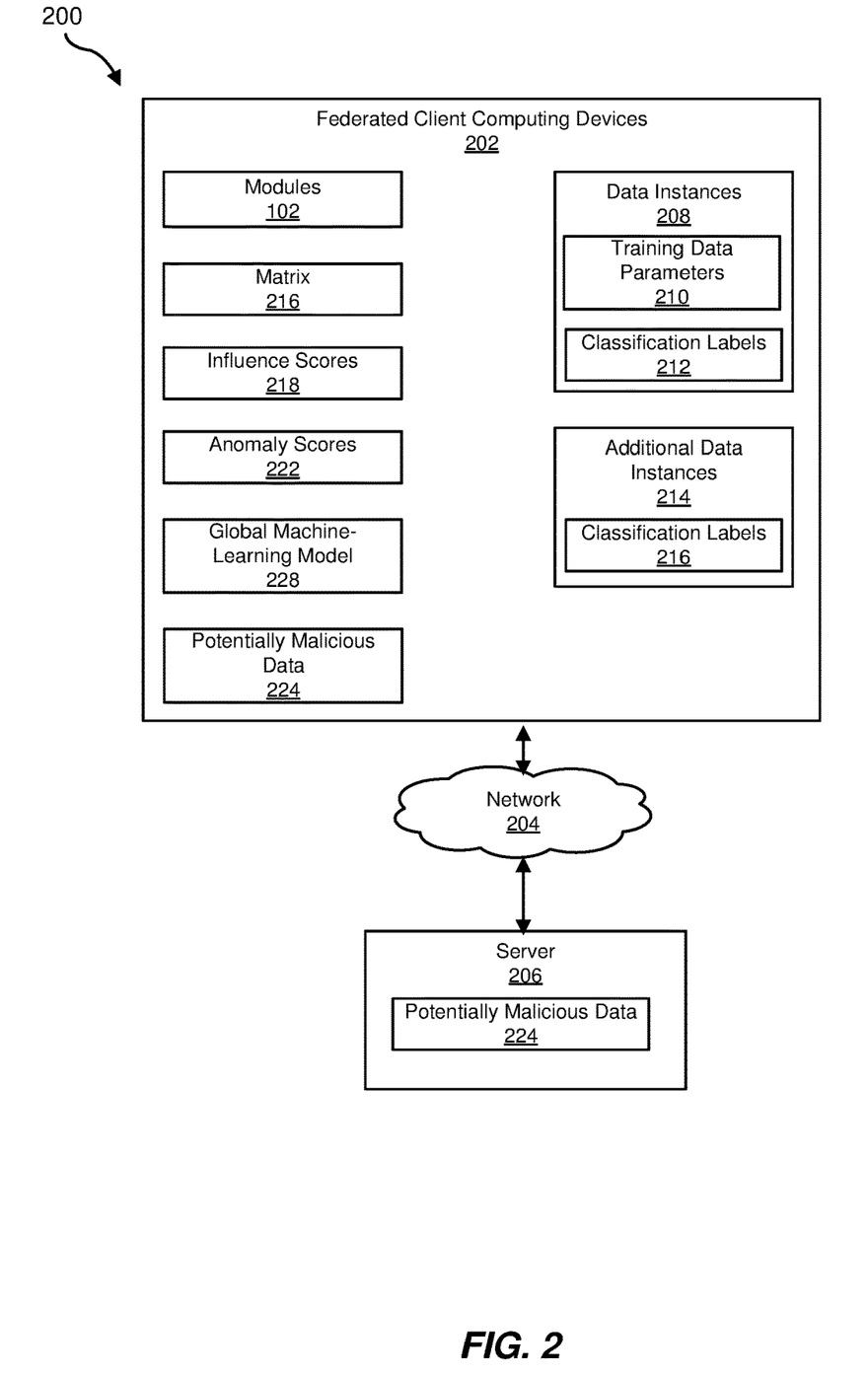
FIG. 2 is a block diagram of an additional example system for verifying decentralized federated data using influence evaluation.

The following will provide, with reference to FIGS. 1-2, detailed descriptions of example systems for verifying decentralized federated data using influence evaluation. Detailed descriptions of corresponding computer-implemented methods will also be provided in connection with FIG. 3. Detailed descriptions of computer-implemented methods for determining an anomaly score will also be provided in connection with FIGS. 4-5. In addition, detailed descriptions of an example computing system and network architecture capable of implementing one or more of the embodiments described herein will be provided in connection with FIGS. 6 and 7, respectively.

FIG. 1 is a block diagram of an example system 100 for verifying decentralized federated data using influence evaluation. As illustrated in this figure, example system 100 may include one or more modules 102 for performing one or more tasks. As will be explained in greater detail below, modules 102 may include a calculation module 104 that calculates an influence score for each of a group of data instances on federated client computing devices. Example system 100 may additionally include a ranking module 106 that ranks the data instances based on the influence scores. Example system 100 may also include a determining module 108 that determines an anomaly score for each of the ranked data instances. Example system 100 may additionally include a selection module 110 that selects the ranked data instances with the highest anomaly scores as containing potentially malicious data. Example system 100 may also include a security module 112 that performs a security action that protects against the potentially malicious data. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., federated client computing devices 202). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate verifying decentralized federated data using influence evaluation. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a data storage 120 for storing data. In one example data storage 120 may store data instances 122, influence scores 124, and anomaly scores 126.

Example system 100 in FIG. 1 may be implemented in a variety of ways. For example, all or a portion of example system 100 may represent portions of example system 200 in FIG. 2. As shown in FIG. 2, system 200 may include federated client computing devices 202 in communication with a server 206 via a network 204. In one example, all or a portion of the functionality of modules 102 may be performed by federated client computing devices 202 federated client computing devices 202 and/or any other suitable computing system. As will be described in greater detail below, one or more of modules 102 from FIG. 1 may, when executed by at least one processor of federated client computing devices 202, enable federated client computing devices 202 to verify decentralized federated data using influence evaluation.

For example, calculating module 104 may utilize matrix 216 to calculate influence sores 218 for data instances 208. Then, ranking module 106 may rank data instances 208 based on influence scores 218 to produce ranked data instances 208. Next, determining module 108 may determine anomaly scores 222 for ranked data instances 208. Then, selection module 110 may select ranked data instances 208 having the highest anomaly scores 222 as containing potentially malicious data 224. Finally, security module 112 may perform a security action 226 that protects against potentially malicious data 224.

Federated client computing devices 202 generally represents any type or form of computing device that is capable of reading computer-executable instructions. In some examples, federated client computing devices 202 may be client computing devices utilized for generating training data for updating machine-learning model 228. Additional examples of federated client computing devices 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represent any type or form of computing device capable of reading computer-executable instructions. In some examples, server 206 may be a federated server for receiving data from federated client computing devices utilized for updating and/or training a global machine-learning model 228. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between federated client computing devices 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Federated client computing devices 202 may also store, within data instances 208, training data parameters 210 and classification labels 212. Federated client computing devices 202 may further store additional data instances 214 including classification labels 216.

Figure 3:
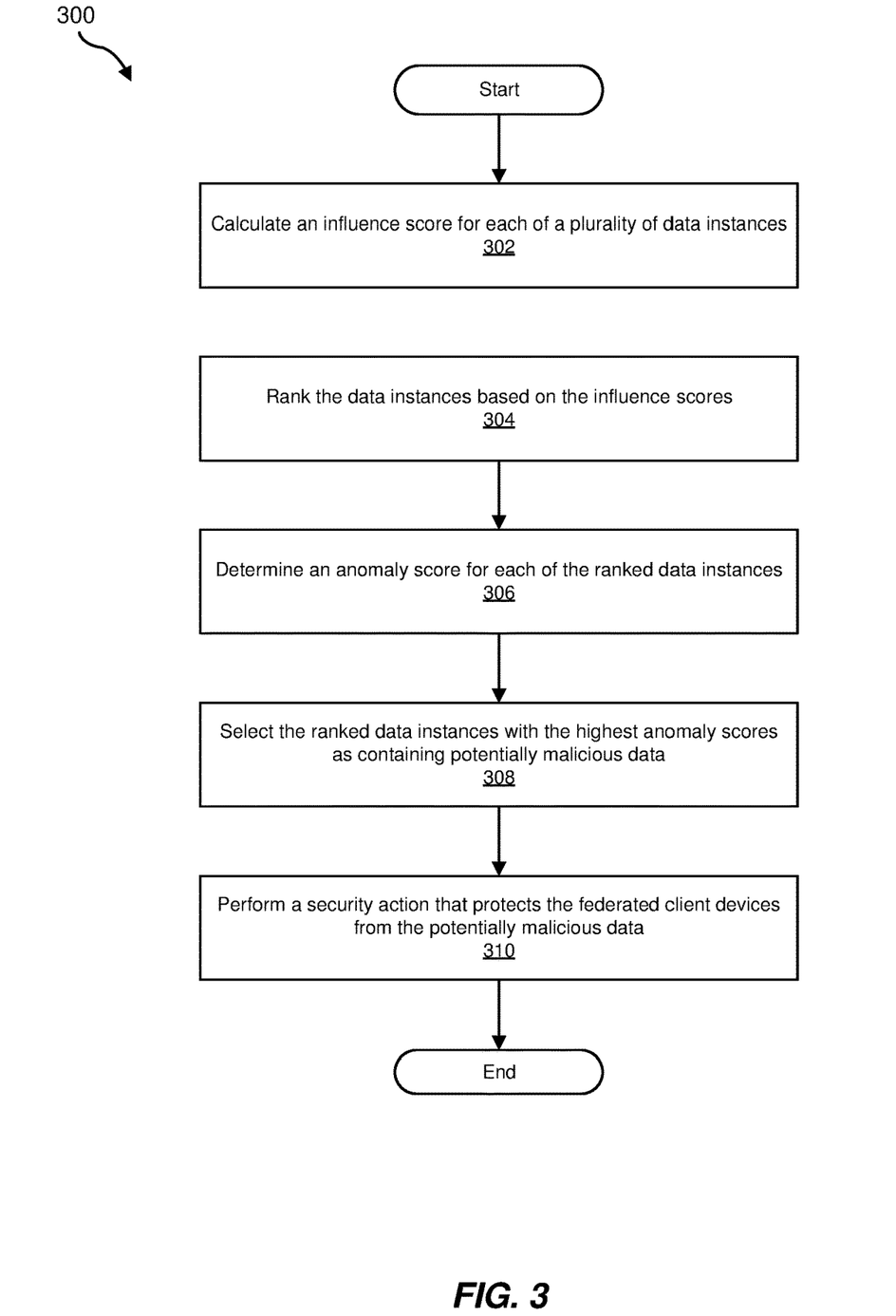
FIG. 3 is a flow diagram of an example method for verifying decentralized federated data using influence evaluation.

FIG. 3 is a flow diagram of an example computer-implemented method 300 for verifying decentralized federated data using influence evaluation. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple substeps, examples of which will be provided in greater detail below.

As illustrated in FIG. 3, at step 302 one or more of the systems described herein may calculate an influence score for each of data instances 208. For example, calculating module 104 may, as part of federated client computing devices 202 in FIG. 2, calculate an influence score 218 for data instances 208.

The term "influence score," as used herein, generally refers to any value representing a statistical measure of a data instance over parameters utilized for updating a machine-learning model (e.g., parameter updates). In one example, an influence score may be determined by computing the inverse of a hessian matrix of an objective function. In this example, each entry of a hessian matrix $H\_\{i,j\}$ may be composed by the second order derivative of an objective function with respect to two different components of the parameter vector theta, as $dL^2/((dtheta\_i)(dtheta\_j))$ (where L is the learning objective function). In federated training, a local approximation to the gradient vector $dL/dtheta\_i$ may first be calculated with the data instance hosted by each local federated client device. Then, all local approximations may be passed to a central server to obtain the exact gradient vector g. The hessian matrix may then be calculated using Broyden-Fletcher-Goldfarb-Shanno (BFGS) based approximation. Finally, the BFGS approximation to the hessian matrix may be broadcasted to local federated client devices to compute the influence score of each data instance.

Calculating module 104 may calculate influence scores 218 in a variety of ways. For example, calculating module 104 may (i) determine matrix 216 based on training data parameters 210 utilized for updating global machine-learning model 228 by data instances 208 and (ii) utilize matrix 216 to calculate influence sores 218 based at least in part on an impact that data instances 208 has on training data parameters 210. In some examples, the impact may be based on a degree of error in predicting a target training data parameter when it is removed from a set of training data parameters 210.

At step 304, one or more of the systems described herein may rank the data instances based on the influence scores. For example, ranking module 106 may, as part of computing device 202 in FIG. 2, rank data instances 208 based on influence scores 218.

Ranking module 106 may rank data instances 208 in a variety of ways. For example, ranking module 106 may rank data instances 208 by ranking a number of the data instances below a predetermined threshold. Additionally or alternatively, ranking module may rank data instances 208 based on a predetermined influence score 218.

At step 306, one or more of the systems described herein may determine an anomaly score for each of the ranked data instances. For example, determining module 108 may, as part of computing device 202 in FIG. 2, determine anomaly scores 222 for ranked data instances 208.

Determining module 108 determine anomaly scores 222 in a variety of ways. For example, determining module 108 may determine anomaly scores 222 by (i) removing at least one data point from a ranked data instances 208, (ii) determining an effect of the removed at least one data point on global machine-learning model 228 during a model update, and (iii) determining an anomaly score 222 based on a deviation in the model update caused by the removed at least one data point. Other methods (e.g., classification and regression methods) for determining anomaly scores 222 will be now be described in greater detail below with respect to FIGS. 4 and 5.

Figure 4:
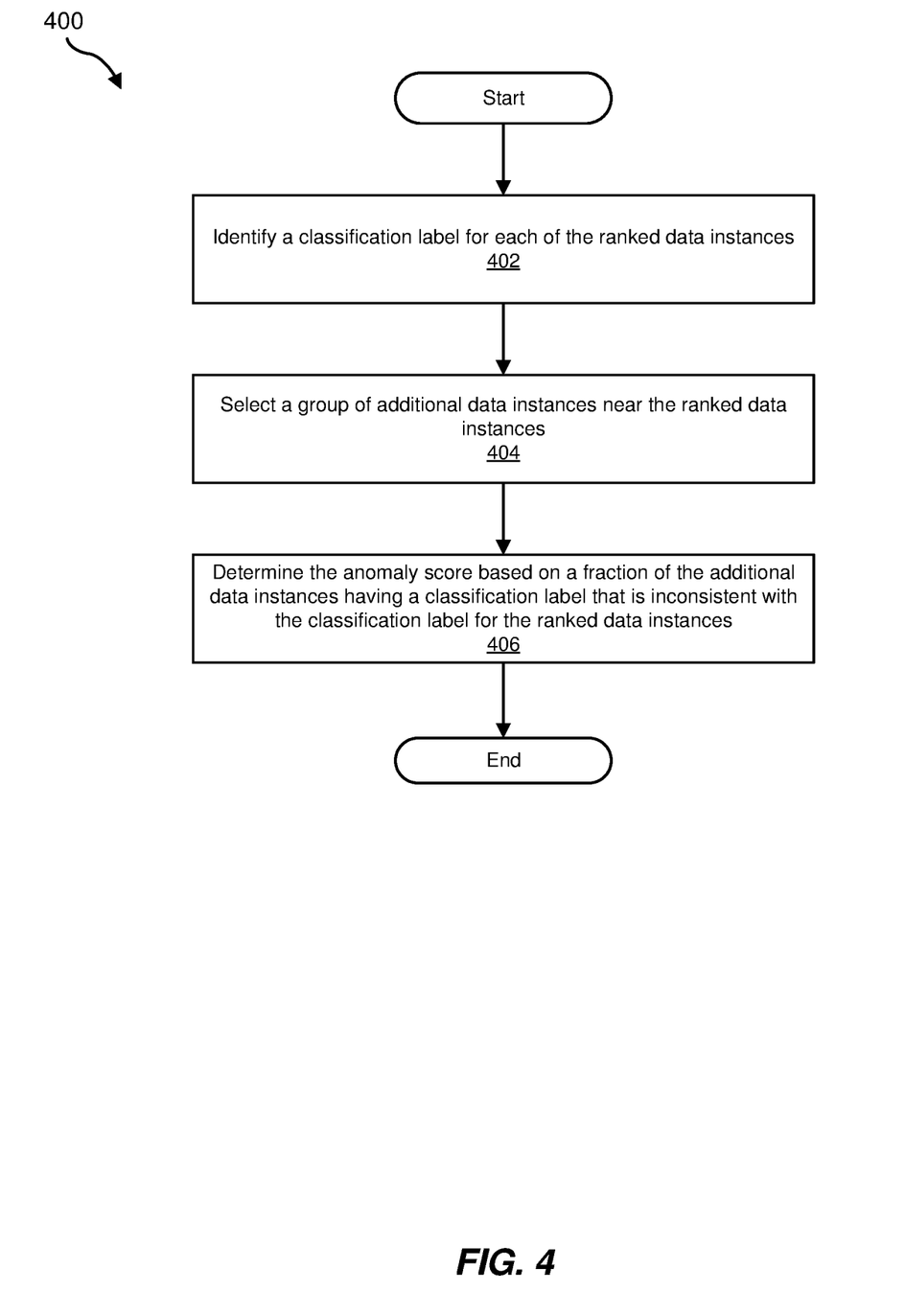
FIG. 4 is a flow diagram of an example method for determining an anomaly score.

FIG. 4 is a flow diagram of an example computer-implemented method 400 for determining an anomaly score. The steps shown in FIG. 4 may be performed by any suitable computer-executable code and/or computing system, including system 100 in FIG. 1, system 200 in FIG. 2, and/or variations or combinations of one or more of the same. In one example, each of the steps shown in FIG. 4 may represent an algorithm whose structure includes and/or is represented by multiple sub-steps, examples of which will be provided in greater detail below.

As illustrated in FIG. 4, at step 402 one or more of the systems described herein may Identify a classification label for each of the ranked data instances. For example, modules 102 may, as part of federated client computing devices 202 in FIG. 2, be configured to identify classification labels 212 for ranked data instances 208. Modules 102 may identify classification labels 212 in a variety of ways.

At step 404 one or more of the systems described herein may select a group of additional data instances near the ranked data instances. For example, modules 102 may, as part of federated client computing devices 202 in FIG. 2, be configured to select additional data instances 214 near ranked data instances 208.

At step 406, one or more of the systems described herein may determine the anomaly score based on a fraction of the additional data instances having a classification label that is inconsistent with the classification label for the ranked data instances. For example, modules 102 may, as part of federated client computing devices 202 in FIG. 2, be configured to determine an anomaly score 222 based on a fraction of additional data instances having a classification label 216 that is inconsistent with a classification label 212 for ranked data instances 208.

In some examples, determining an anomaly score 222 may include selecting the local K-nearest neighbors to each of a number of influential data instances. In classification scenarios, the fraction of the neighbors who hold different labels from a selected influential data instance may be counted. This fraction score may be used as an inconsistency score to measure the anomaly level of the data instance.

Figure 5:
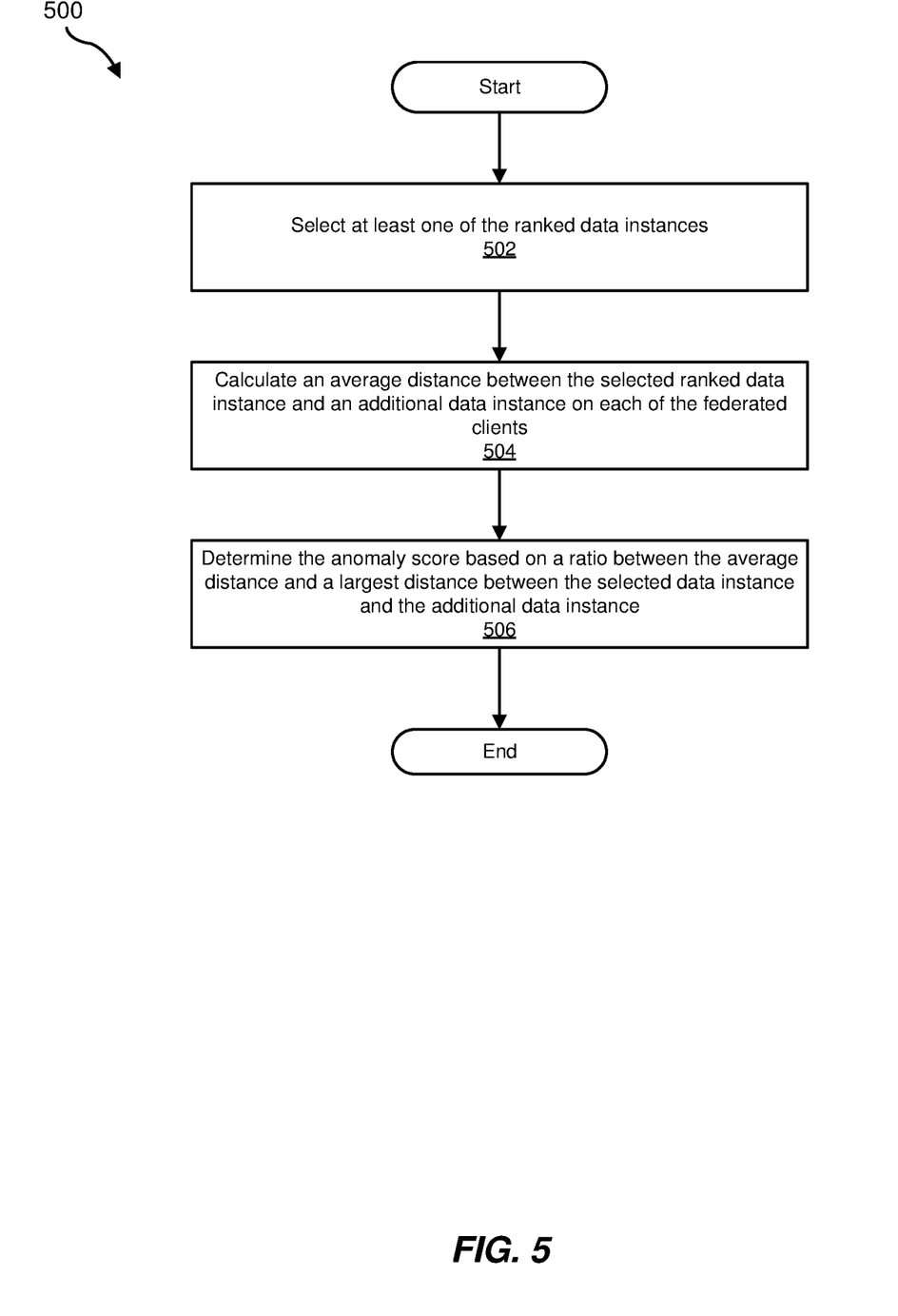
FIG. 5 is a flow diagram of another example method for determining an anomaly score.

FIG. 5 is a flow diagram of an example computer-implemented method 500 for determining an anomaly score. The steps shown in FIG. 5 may be performed by any suitable computer-executable code and/or computing system, including system 100 in FIG. 1, system 200 in FIG. 2, and/or variations or combinations of one or more of the same. In one example, each of the steps shown in FIG. 5 may represent an algorithm whose structure includes and/or is represented by multiple sub-steps, examples of which will be provided in greater detail below.

As illustrated in FIG. 5, at step 502 one or more of the systems described herein may select at least one of the ranked data instances. For example, modules 102 may, as part of federated client computing devices 202 in FIG. 2, be configured to select at least one ranked data instance 208.

At step 504 one or more of the systems described herein may calculate an average distance between the selected ranked data instance and an additional data instance on each of the federated clients. For example, modules 102 may, as part of federated client computing devices 202 in FIG. 2, be configured to calculate an average distance between a selected ranked data instance 208 and an additional data instance 214.

At step 506, one or more of the systems described herein may determine the anomaly score based on a ratio between the average distance and a largest distance between the selected data instance and the additional data instance. For example, modules 102 may, as part of federated client computing devices 202 in FIG. 2, be configured to determine an anomaly score 222 based on a ratio between the average distance and a largest distance between a selected ranked data instance 208 and an additional data instance 214.

In some examples, determining an anomaly score 222 may include calculating an average L1 distance between a regression target of the K-neighbors to the selected data instance. The ratio between the average L1 distance and the largest L1 distance between any pair of data instances inside a local neighborhood (e.g., group of federated client devices) may be extracted as the anomaly level measurement. Additionally or alternatively, if there is a deviation in model updates that a central host server is attempting to explain or understand, influence functions may be utilized to determine the effect of leaving out various data points. The data points that most strongly influence an abnormal region of the parameter space may be used to calculate the anomaly level of a data point.

Returning now to FIG. 3, at step 308, one or more of the systems described herein may select the ranked data instances with the highest anomaly scores as containing potentially malicious data. For example, selection module 110 may, as part of federated client computing devices 202 in FIG. 2, select from among ranked data instances 208, the data instances having the highest anomaly scores 222 as the most likely candidates for containing potentially malicious data 224.

At step 310, one or more of the systems described herein may perform a security action that protects against the potentially malicious data. For example, security module 112 may, as part of federated client computing devices 202 in FIG. 2, perform security action 216 to protect against potentially malicious data 224.

Security module 112 may perform security action 226 in a variety of ways. For example, security module 112 may remove ranked data instances 208 with the highest anomaly scores 222 (based on the likelihood that they contain potentially malicious data 224). Additionally or alternatively, security module 112 may flag ranked data instances 208 with the highest anomaly scores 222 as containing potentially malicious data 224 and send a notification of the potentially malicious data to server 206. In some examples, security action 226 may include providing ranked data instances 208 with the highest anomaly scores 222 to human domain experts associated with server 206. The domain experts may also verify whether an associated anomaly (e.g., a classification label or a regression value) is correct or within a normal range. The domain experts may then make a binary decision (e.g., yes or no) based on the verification and subsequently determine whether to keep or remove a ranked data instance 208 in a training data set or alternatively, flag a ranked data instance 208 as potentially malicious, or flag the contributor of a ranked data instance 208 as a potentially malicious actor.

As explained in connection with method 300 above, the systems and methods described provide for detecting malicious content in decentralized federated machine-learning model updates. A threat detection application may be configured to verify decentralized federated data instances using influence evaluation. An influence for each data instance may be calculated over parameter updates. Next, the data instances may then be globally ranked according to their influence scores to identify anomaly levels. Then, the most influential data instances having the highest anomaly levels may be selected and provided to human domain experts to verify whether an assigned label (classification) or regression value (regression) is within a normal range. Based on the verification, the threat detection application may keep or remove data instances in a training data set and/or flag the training data (or the training data contributor) as potential malicious.

Figure 6:
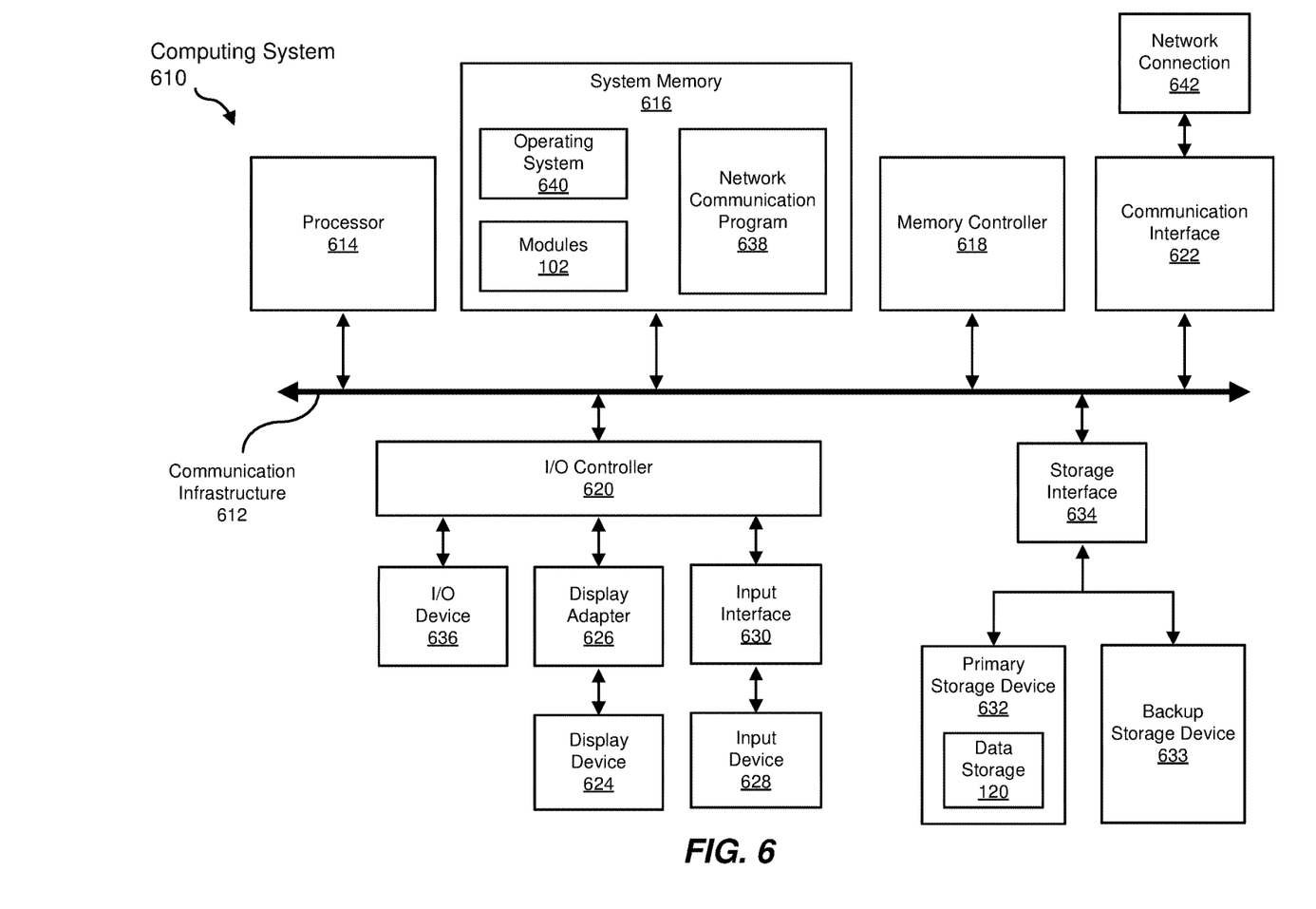
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, data storage 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
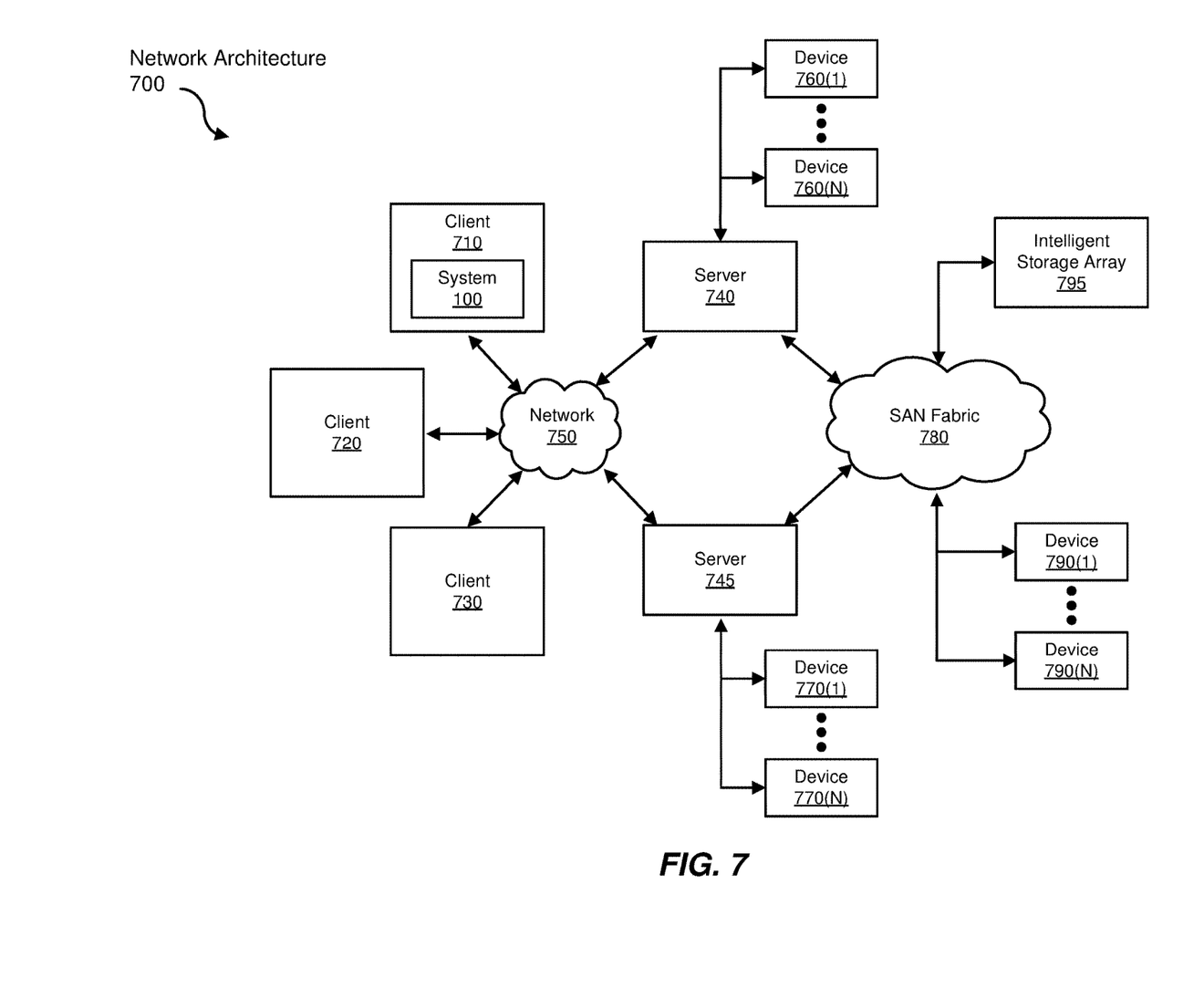
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for verifying decentralized federated data using influence evaluation.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for verifying decentralized federated data using influence evaluation, at least a portion of the method being performed by one or more federated client computing devices comprising at least one processor, the method comprising:
   receiving, by the one or more federated client computing devices, a plurality of data instances from one or more federated client devices;
   calculating, by the federated client computing devices, an influence score for each of a plurality of data instances, wherein calculating the influence score comprises:
      determining a matrix based on a set of training data parameters utilized for updating a global machine-learning model by the data instances; and
      utilizing the matrix to calculate the influence score based at least in part on an impact that each of the data instances has on the set of training data parameters;
   ranking, by the federated client computing devices, the data instances based on the influence scores;
   determining, by the federated client computing devices, an anomaly score for each of the ranked data instances;
   selecting, by the federated client computing devices, the ranked data instances with the highest anomaly scores as containing potentially malicious data; and
   performing, by the federated client computing devices, a security action that protects against the potentially malicious data.

2. The computer-implemented method of claim 1, wherein the plurality of data instances comprises training data for updating a global machine-learning model.

3. The computer-implemented method of claim 1, wherein the impact that each of the data instances has on the set of training data parameters comprises a degree of error in predicting a target training data parameter when the target training data parameter is removed from the set of training data parameters.

4. The computer-implemented method of claim 1, wherein ranking the data instances comprises ranking a number of the data instances below a predetermined threshold.

5. The computer-implemented method of claim 1, wherein ranking the data instances comprises ranking based on a predetermined influence score.

6. The computer-implemented method of claim 1, wherein determining the anomaly score comprises:
identifying a classification label for each of the ranked data instances;
selecting a group of additional data instances stored on the one or more federated client devices that are neighbors of the ranked data instances received from the one or more federated client devices; and
determining the anomaly score based on a fraction of the additional data instances having a classification label that is inconsistent with the classification label for the ranked data instances.

7. The computer-implemented method of claim 1, wherein determining the anomaly score comprises:
selecting at least one of the ranked data instances;
calculating an average distance between the selected ranked data instance and an additional data instance on each of the federated clients; and
determining the anomaly score based on a ratio between the average distance and a largest distance between the selected data instance and the additional data instance.

8. The computer-implemented method of claim 1, wherein determining the anomaly score comprises:
removing at least one data point from the ranked data instances;
determining an effect of the removed at least one data point on a federated machine-learning model during a model update; and
determining the anomaly score based on a deviation in the model update caused by the removed at least one data point.

9. The computer-implemented method of claim 1, wherein performing the security action comprises at least one of:
removing the data instances with the highest anomaly scores; and
flagging the data instances with the highest anomaly scores as containing the potentially malicious data.

10. A system for verifying decentralized federated data using influence evaluation, the system comprising:
at least one physical processor;
physical memory comprising a plurality of modules and computer-executable instructions that, when executed by the physical processor, cause the physical processor to:
calculate, by a calculation module, an influence score for each of a plurality of data instances, wherein the calculation module calculates the influence score by:
determining a matrix based on a set of training data parameters utilized for updating a global machine-learning model by the data instances; and
utilizing the matrix to calculate the influence score based at least in part on an impact that each of the data instances has on the set of training data parameters;
rank, by a ranking module, the data instances based on the influence scores;
determine, by a determining module, an anomaly score for each of the ranked data instances;
select, by a selection module, the ranked data instances with the highest anomaly scores as containing potentially malicious data; and
perform, by a security module, a security action that protects against the potentially malicious data.

11. The system of claim 10, wherein the plurality of data instances comprises training data for updating a global machine-learning model.

12. The system of claim 10, wherein the impact that each of the data instances has on the set of training data parameters comprises a degree of error in predicting a target training data parameter when the target parameter is removed from the set of training data parameters.

13. The system of claim 10, wherein the ranking module ranks the data instances by ranking a number of the data instances below a predetermined threshold.

14. The system of claim 10, wherein the ranking module ranks the data instances based on a predetermined influence score.

15. The system of claim 10, wherein the determining module determines the anomaly score by:
identifying a classification label for each of the ranked data instances;
selecting a group of additional data instances stored on one or more federated client devices that are neighbors of the ranked data instances, wherein the ranked data instances are received from the one or more federated client devices; and
determining the anomaly score based on a fraction of the additional data instances having a classification label that is inconsistent with the classification label for the ranked data instances.

16. The system of claim 10, wherein determining module determines the anomaly score by:
selecting at least one of the ranked data instances;
calculating an average distance between the selected ranked data instance and an additional data instance on each of the federated clients; and
determining the anomaly score based on a ratio between the average distance and a largest distance between the selected data instance and the additional data instance.

17. The system of claim 10, wherein determining module determines the anomaly score by:
removing at least one data point from the ranked data instances;
determining an effect of the removed at least one data point on a federated machine-learning model during a model update; and
determining the anomaly score based on a deviation in the model update caused by the removed at least one data point.

18. A non-transitory computer-readable medium comprising one or more computer-executable instructions that, when executed by at least one processor of a computing device, cause the computing device to:
calculate an influence score for each of a plurality of data instances, wherein the influence score is calculated by:

determining a matrix based on a set of training data parameters utilized for updating a global machine-learning model by the data instances; and utilizing the matrix to calculate the influence score based at least in part on an impact that each of the data instances has on the set of training data parameters;

rank the data instances based on the influence scores;

determine an anomaly score for each of the ranked data instances;

select the ranked data instances with the highest anomaly scores as containing potentially malicious data; and perform a security action that protects against the potentially malicious data.

\* \* \* \* \*